United States Patent [19]
David

[11] 3,854,761
[45] Dec. 17, 1974

[54] SEALING ARRANGEMENT
[75] Inventor: Walfried David, Maxdorf, Germany
[73] Assignee: Bopp & Reuther GmbH, Mannheim, Germany
[22] Filed: Jan. 8, 1973
[21] Appl. No.: 322,093

[30] Foreign Application Priority Data
Jan. 11, 1972 Germany............................ 2201131

[52] U.S. Cl............... 285/336, 277/206 R, 285/363
[51] Int. Cl.............................................. F16l 23/00
[58] Field of Search .......... 285/336, 363, 365, 366, 285/368, 111, 112, 113; 277/206 R, 180; 251/148

[56] References Cited
UNITED STATES PATENTS

| | | | |
|---|---|---|---|
| 1,905,822 | 4/1933 | Dunn | 277/206 |
| 2,684,861 | 7/1954 | Loeffler | 285/112 |
| 2,780,483 | 3/1953 | Kessler | 285/336 X |
| 3,537,731 | 11/1970 | Reddy | 277/206 X |
| 3,620,556 | 11/1971 | Paddington | 285/336 X |

FOREIGN PATENTS OR APPLICATIONS

| | | | |
|---|---|---|---|
| 531,981 | 11/1921 | France | 285/363 |
| 577,700 | 5/1946 | Great Britain | 285/111 |
| 134,706 | 11/1929 | Switzerland | 285/336 |
| 869,453 | 3/1953 | Germany | 277/206 |

*Primary Examiner*—Thomas F. Callaghan
*Attorney, Agent, or Firm*—Michael S. Striker

[57] ABSTRACT

Two components each have a flange which are provided with surfaces juxtaposed with one another. An annular recess is provided in one of these surfaces and bounded at its radially outer side by an outwardly inclined annular surface portion, and another annular recess is provided in the other surface and is bounded at its radially outer side by an outwardly inclined additional annular surface portion and at its radial inner side by an annular bead which projects beyond the general plane of the surface in which the second recess is provided. An annular sealing ring of elastomeric material embraces the bead under tension and is axial section of substantially strip-shaped configuration, having two axially spaced radially outwardly directed annular ridges each of which contacts one of the inclined annular surface portions.

3 Claims, 3 Drawing Figures

SEALING ARRANGEMENT

BACKGROUND OF THE INVENTION

The present invention relates generally to a sealing arrangement, and more particularly to an arrangement for sealing a connection between two flanges, or components having two flanges.

Various types of components are provided with flanges which serve to connect them together, at which a seal must be established. This is for instance true in the case of shut-off valves for liquid and gas pipes, to name just one example. Two basic types of sealing elements for poroviding a seal at such a location are known unitl now, namely flat or planar sealing rings and so-called O-rings.

There are certain disadvantages in the flat sealing rings which have made it seem advisable to resort in many instances to O-rings. These O-rings are either provided in a groove formed in one of the flanges and in which they are partly located, contacting a surface of the opposite flange, or the two flanges are each provided in a respective juxtaposed surface with a groove and the O-ring is partially received in each of these grooves. When the flanges are then drawn together the O-ring is compressed unitl the flanges move into surface-to-surface abutment of their juxtaposed surfaces, and the O-ring then fills the groove or grooves and provides a seal.

It has been found that due to the metal-to-metal contact between the juxtaposed surface of the flanges the O-ring seals do not have the disadvantages of the flat ring seals, where the degree of compression depends upon the extent to which the connecting screws are tightened and thus cannot be clearly defined in each and every instance. On the other hand, the use of an O-ring seal requires that the surface portions of the flanages which contact one another be smooth and planar, and that the same is true of the groove or grooves for the O-ring, because the O-ring can be compressed only to a certain amount before it undergoes permanent deformation which in the long run will result in a deterioration of the effectiveness of the seal. If the O-ring is compressed too much, permanent deformation will result and this has been found particularly at low pressures where the O-rings which have once undergone permanent deformations tend to leak, because they are no longer subject to sufficient pressure by the medium flowing through the components having the flanges, so that they would be pressed into sealing engagement with the surrounding surfaces. Another difficulty is that if the O-ring is very strongly compressed between the flanges some of the material of the O-ring will frequently be forced out of the groove or grooves in which the O-ring is accommodated, and will be damaged between the contacting metallic surfaces of the flanges.

SUMMARY OF THE INVENTION

It is, accordingly, an object of the present invention to overcome the disadvantages of the prior art.

More particularly it is an object of the invention to provide an improved sealing arrangement of the type under discussion which is not possessed of these disadvantages.

Still more particularly it is an object of the present invention to provide a sealing arrangement for a flanged connection which is very simple and yet assures a permanent and reliable seal.

In keeping with these objects and others which will become apparent hereafter, one feature of the invention resides in a sealing arrangement which, briefly stated, comprises two components each having a flange provided with a surface juxtaposed with a surface of the respective other flange. A first annular recess is formed in one of the surfaces and bounded at its radially outer side by an outwardly inclined first annular surface portion, and at its radially inner side by a recessed annular surface portion. A second annular recess is formed in the other of the surfaces and provided at its radially outer side by an outwardly inclined second annular surface portion forming a roof-shaped configuration with the first annular surface portioin, and at its radially inner side by anannular bead which projects beyond the general plane of the surface in which the second annular recess is formed, towards the recessed annular surface portion which it approaches but does not contact. Each of the first and second annular surface portions are outwardly surrounded by ring-shaped contact surfaces which, when the components are connected, will contact one another. An annular sealing ring of elastomeric material embraces the annular bead under tension and in axial section this sealing ring is of substantially strip-shaped configuration. It has two axially spaced radially outwardly directed annular ridges each of which contacts one of the first and second annular surface portions.

The axial length of the sealing ring is greater than the axial length of the annular space defined by the two recesses when the components are connected with one another in sealing relationship, by an amount corresponding to the extent to which the sealing ring is to be allowed to be compressed.

This particular configuration of the flanges in conjunction with the particular configuration of the sealing ring assures a seal which to all intents and purposes makes it impossible for the material of the sealing ring to be damaged or to be permanently deformed. Even if the various surfaces on the flanges are completely even or smooth, a sufficient seal is nevertheless obtained to provide for a permanent and reliable installation.

Because of its particular configuration the sealing ring can be elastically deformed to a much more substantiall degree than the heretofore used O-rings, and it can be pushed onto the aforementioned bead under pretension before the flanged components are connected so that it is in a properly oriented position at the time the connection takes place and it is not to be feared that during the connection of the flanged components the sealing ring might shift in its position. The radially outwardly directed wall bounding the bead provides for a straight contact surface for the sealing ring and assures that the latter is properly supported as it undergoes compression during the connection of the flanged components.

The outwardly directed ridges of the sealing ring, in conjunction with the roof-shaped configuration of the two cooperating first and second annular surface portions, provide for an additional sealing effect which results from the fact that during the drawing-together of the two flanges the outer ridges will move along the inclined first and second surface portions and will contact these surfaces under high compression. This sealing effect is further enhanced when the pressure of medium in the components being sealed is high, because this medium pressure will act from the inner side against the sealing ring and will tend to push the ridges towards one another along the inclined annular surface portions, the sealing ring being capable of deformation unitl the two ridges actually contact one another, which results in a still greater compression of the ridges and higher sealing effectiveness as the latter contact the inclined annular surface portions. The basic seal, however, takes place between the bottom of the grooves in the one flange and the recessed surface portion which in part bounds the groove in the other flange, and due to the particular configuration of the sealing ring the extent to which the latter can elastically compressed is so sufficient that here also a particularly good sealing effectiveness is achieved. The gap which exists between the bead and the juxtaposed depressed surface portion assures that the two contact surfaces of the two flanges will be in reliable metal-to-metal contact under all circumstances, and that there will be a sufficient gap remaining to permit the pressure of the medium in the interior of the components to act upon the sealing ring with the desirable enhancement of the sealing effectiveness which has been mentioned above.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED
EMBODIMENTS

Figure 1:
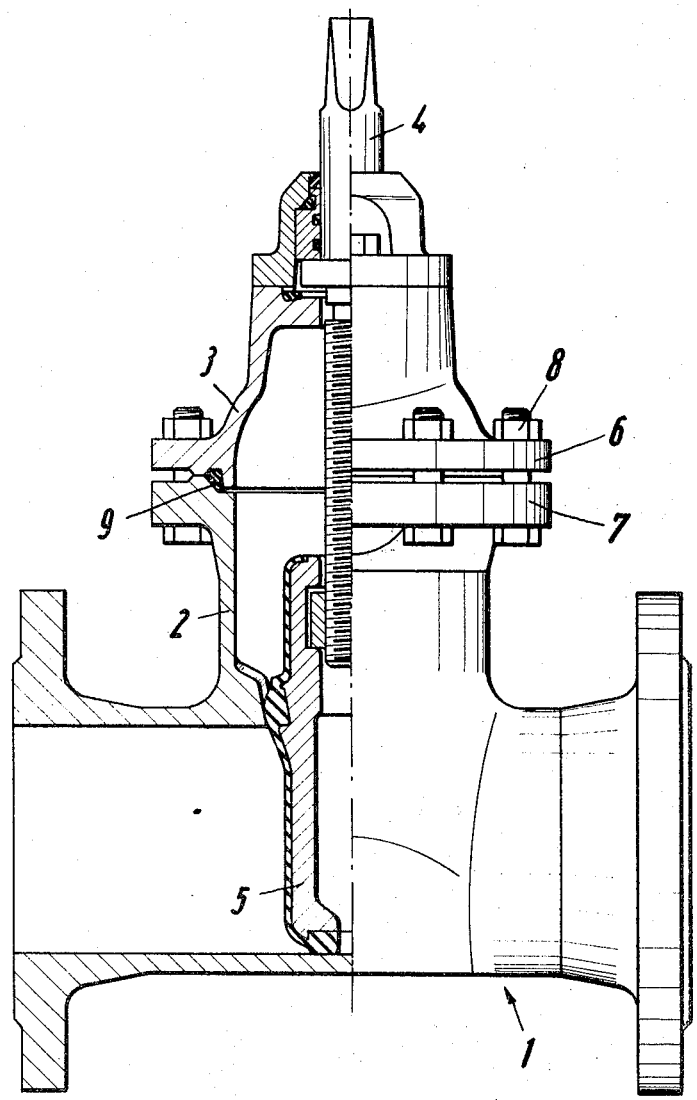
FIG. 1 is a side-elevational view, partly in section, illustrating an embodiment of the invention.
Figure 2:
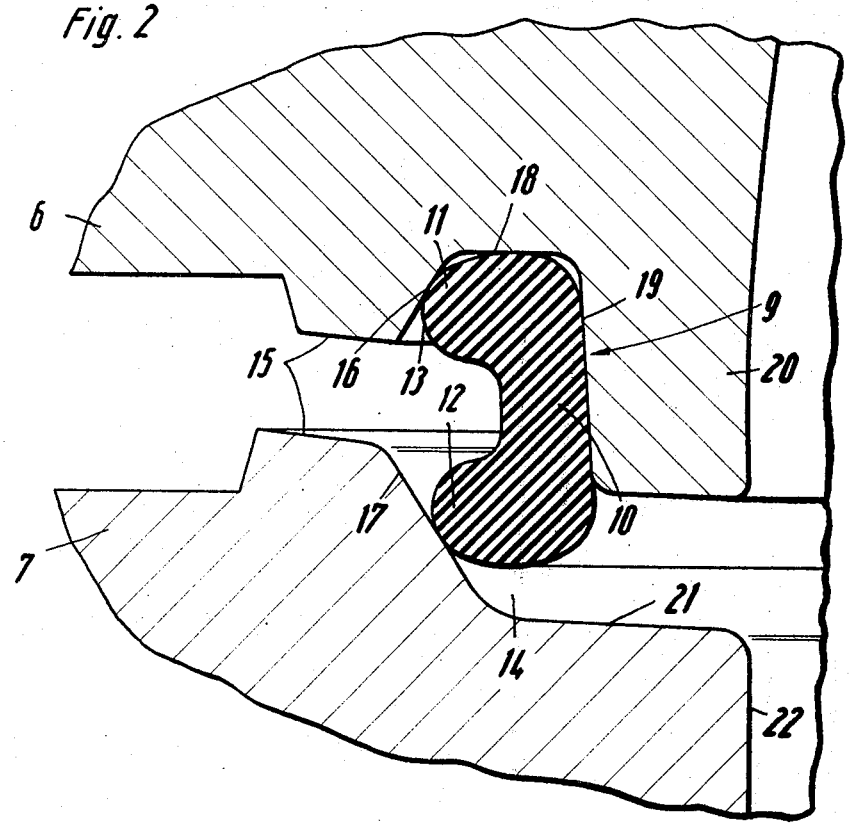
FIG. 2 is a fragmentary sectioned detail view showing a detail of the seal in the arrangement of FIG. 1, with the sealing element in non-compressed condition.
Figure 3:
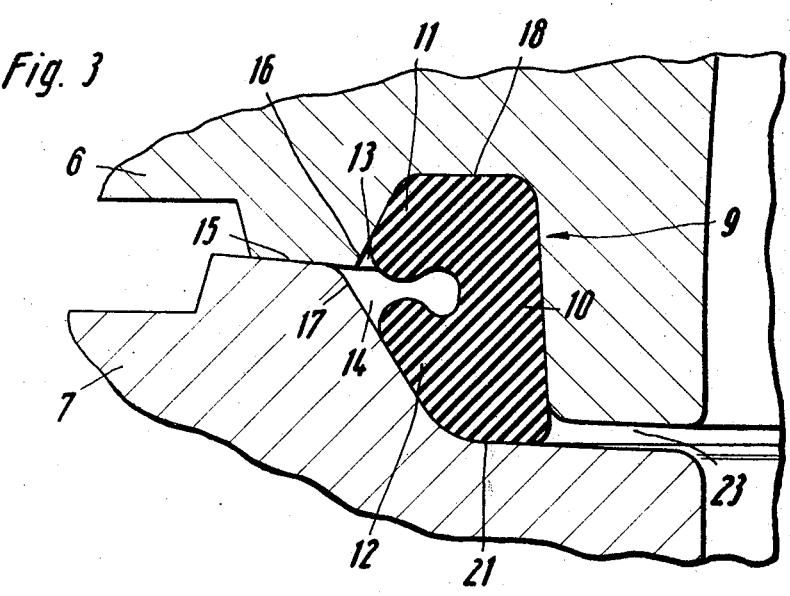
FIG. 3 shows the detail of FIG. 2 but with the sealing element in compressed condition.

Discussing now FIGS. 1–3 in detail, which illustrated a single embodiment of the invention, it will be seen that the invention has been shown by way of example on a shut-off valve for a pipe or the like. The valve has a housing 1 with a portion 2 which constitutes one flanged component, and a cover 3 which constitutes another flanged component. A spindle 4 is provided which serves to longitudinally shift a valve gate 5 in the interior of the valve. The portion 2 is connected with the portion 3 —after the valve gate 5 has been inserted— via flanges 6 and 7 and connecting screws 8. A seal at the joint of the flanges 6 and 7 is provided by the sealing ring 9.

FIG. 2 shows a detail of the seal with the sealing ring 9 in non-compressed condition, and FIG. 3 shows the same detail but illustrating how the sealing ring 9 appears when it is in compressed condition, that is when the flanges 6 and 7 have been connected by tightening of the screws 8. The sealing ring 9 is in axial section configurated as a strip 10 and provided with two axially spaced radially outwardly projecting annular ridges 11 and 12. The upper flange 6 is provided with a recess 13 and the lower flange 7 with a recess 14 which define with one another an annular space having the configuration shown in FIG. 3, when the screws 8 are tightened to connect the flanges 6 and 7 with one another. In this annular space the sealing ring 9 is accommodated.

It will be seen that the recess 13 and the recess 14 which extends to the inner surface of the passage bounded by the flange 7, are bounded in radially outward direction by inclined annular surface portions 16 and 17, respectively, which are inclined in a roof-shaped manner towards one another and approximately meet at the ring-shaped surface portions 15 which surround them radially outwardly and which serve to move into metal-to-metal abutment when the screws are tightened (see FIG. 3).

The groove 13 has a substantially horizontal bottom surface 18 which is only short and which merges into the vertical boundary face 19 of an annular bead 20. The recess 14 has a substantially horizontal bottom surface 21 which extends to the inner circumferential wall 22. The bead 20 extends downwardly beyond the general plane in which the recess 13 is formed, to such an extent that when the surfaces 15 are in abutment (see FIG. 3) it extends almost to but not into contact with the surface 21, leaving a gap 23 as shown in FIG. 3. Almost the entire inner circumferential surface of the sealing ring 9 is supported by the surface 19 of the bead 20 (compare FIGS. 2 and 3).

When the arrangement is to be assembled, the cover 3 is first removed and thereupon the sealing ring 9 is sufficiently expanded so that it can be pushed over the bead 20. This fixed it in its position during the assembly. Thereupon the cover 3 is put in place with the valve gate 5 having been previously installed, and now the screws 8 are used to draw the flanges 6 and 7 into abutment. As this takes place the screws 13 and 14 move towards one another and the sealing ring 9 undergoes axial compression. This continues until the surfaces 15 move into contact, and at this time only the gap 23 which is open to the interior 22 of the housing, remains between the surface 21 and the bead 20.

As the flanges are being drawn together the two annular ridges 11 and 12 of the sealing ring 9 are not only pressed against the surfaces 18 and 21 but are also pushed outwardly against the inclined surfaces 16 and 17, so that the resulting wedging effect provided for good sealing contact on the surfaces 16 and 17 and the surfaces 19, even if these surfaces are not entirely even. The two ridges 11 and 12 approach one another to such an extent that the sealing ring 9 has a rolled almost closed configuration (i.e. the ridges 11 and 12 are almost in contact as shown in FIG. 3), with the result that there are large sealing contact areas between the sealing ring and the surfaces 16 and 17. If, now, the medium in the interior 22 is at high pressure, then this pressure will act upon the sealing ring 9 via the gap 23, causing the ridges 11 and 12 to move still closer (depending upon the degree of pressure) unitl they may even contact one another. The sealing ring is forced by the pressure of the medium in the direction of the tip defined by the roof-shaped relative inclination of the surfaces 16 and 17 to such an extent that there will be contact with the sealing ring 10 almost to this tip.

This excellent contact of the sealing ring 9 with the various surfaces assures that even if there are differential tolerances in the flanges 6 and 7 and in the various surfaces thereof, a permanent and reliable seal is obtained. This, in turn, means that the grooves 13 and 14 and all the other surfaces on the flanges need not be finished but can be simply cast to approximate tolerances, because the desired sealing effect will nevertheless be obtained.

Tests with the arrangement according to the present invention have shown that a completely reliable seal is obtainable not only when the medium in the interior of the housing is at high pressure, but even if it is at low pressure and even if it is at underpressure as low as vacuum. The sealing effect is obtained during drawing-together of the flanges 6 and 7 by the screws 8 purely due to the deformation of the sealing element 9, which is tightly pressed against all of the various surfaces described and illustrated, so that a reliable double sealing effect is obtained without the aid of the medium pressure in the interior of the housing.

It will be understood that each of the elements described above, or two or more together, may also find a useful application in other types of constructions differing from the types described above.

While the invention has been illustrated and described as embodied in a sealing aarangement, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A sealing arrangement comprising two components each having a flange portion with a surface juxtaposed with a surface of the respective other flange; a first annular recess in one of said surfaces and being bounded by a first annular bottom face and at its radially outer side by an outwardly inclined first annular surface portion; a second annular recess in the other of said surfaces and being bounded by a second annular bottom face and at its radially outer side by an outwardly inclined second annular surface portion, and at its radially inner side by an annular bead projecting beyond the general plane of said other surface toward said first annular bottom face, said recesses together defining an annular space when said components are connected with one another in sealing relationship in which the surface of one flange abuts against the surface of the other flange and said bead extends into said first recess and is slightly spaced from said first annular bottom face and an annular sealing ring of elastomeric material embracing said annular bead under tension, the outer surface of said bead engaging and supporting said sealing ring throughout approximately its entire axial length, said sealing ring being in axial section of substantially strip-shaped configuration and and having two axially spaced radially outwardly directed annular ridges each of which contacts one of said annular surface portions and the annular bottom face associated therewith, means to secure the components together, said sealing ring being compressed in axial direction when said components are connected in said sealing relationship without, however, completely filling said annular space, and said annular ridges being deflected toward one another in said axial direction by their contact with the respective surface portion and bottom faces.

2. A sealing arrangement as defined in claim 1, wherein each of said surfaces further comprises a ring-shaped surface portion encircling the respective first and second annular surface portions, and wherein said ring-shaped surface portions are in abutment when said components are connected in sealing relationship.

3. A sealing arrangement as defined in claim 1, wherein said annular sealing ring has an initial axial length which is greater than the axial length of said annular space by the amount to which the annular sealing ring is to be allowed to become compressed when said components are connected in sealing relationship.

* * * * *